United States Statutory Invention Registration [19]

Design [11] Reg. Number: H418

Lee [43] Published: Feb. 2, 1988

[54] RAZOR

[75] Inventor: Alejandro C. Lee, Cambridge, Mass.

[73] Assignee: The Gillette Company, Boston, Mass.

[21] Appl. No.: 882,340

[22] Filed: Jul. 7, 1986

[52] U.S. Cl. ..... D28/46

*Primary Examiner*—Stephen C. Buczinski
*Assistant Examiner*—Linda J. Wallace

[57] CLAIM

The ornamental design for a razor, substantially as shown and described.

DESCRIPTION

Figure 1:
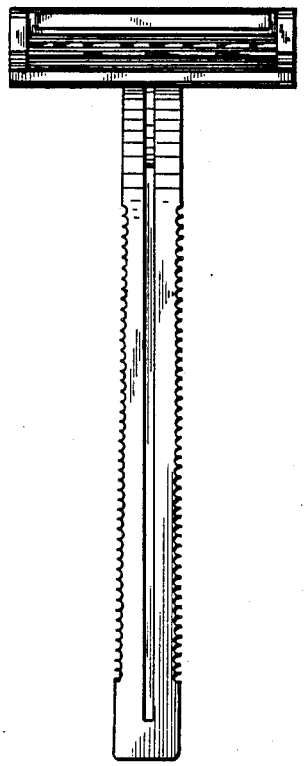
Figure 2:
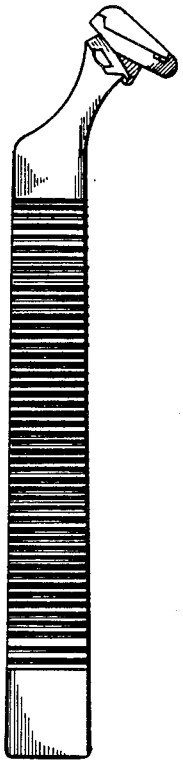
Figure 3:
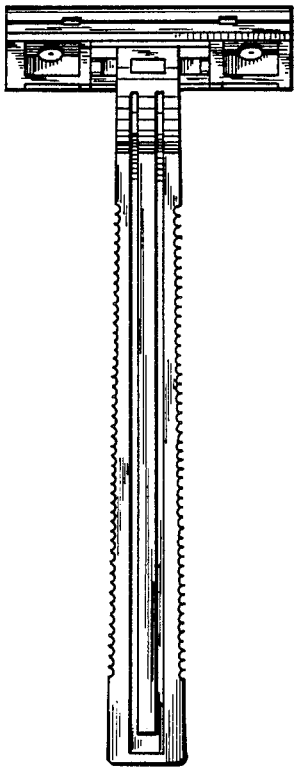
Figure 4:
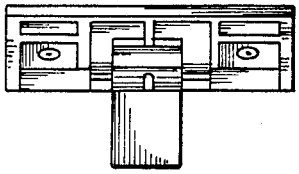
Figure 5:
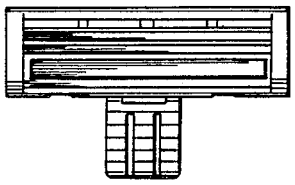

FIG. 1 is a front elevational view of a razor showing my new design;
FIG. 2 is a left side elevational view, the opposite side being substantially a mirror image thereof;
FIG. 3 is a rear elevational view thereof;
FIG. 4 is a bottom view thereof; and
FIG. 5 is a top plan view thereof.

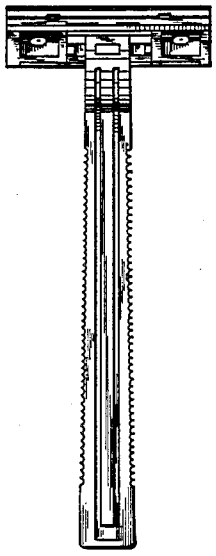

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.